United States Patent [19]

Scholze et al.

[11] 4,238,590

[45] Dec. 9, 1980

[54] PROCESS FOR THE PRODUCTION OF SILICIC ACID HETEROPOLYCONDENSATES USEFUL AS MEMBRANES AND ADSORBENTS

[75] Inventors: Horst Scholze, Würzburg; Helmut Schmidt, Höchberg, both of Fed. Rep. of Germany

[73] Assignee: Fraunhofer-Gesellschaft, Munich, Fed. Rep. of Germany

[21] Appl. No.: 973,560

[22] Filed: Dec. 27, 1978

[30] Foreign Application Priority Data

Dec. 28, 1977 [DE]  Fed. Rep. of Germany ....... 2758415

[51] Int. Cl.$^3$ .............................................. C08G 77/56
[52] U.S. Cl. ......................................... 528/5; 521/51; 521/154; 528/8; 528/9; 528/12; 528/14; 528/16; 528/20; 528/21; 528/25; 528/29; 528/31; 528/32; 528/38; 528/39; 528/41; 528/42; 528/43; 210/500.2
[58] Field of Search ............... 528/5, 8, 9, 25, 29, 528/31, 38, 39, 12, 14, 20, 21, 16, 32, 41, 42, 43; 521/154, 51; 210/500 M

[56] References Cited

U.S. PATENT DOCUMENTS

| | | | |
|---|---|---|---|
| 2,446,135 | 7/1948 | Hyde | 528/39 |
| 2,470,562 | 5/1949 | Hyde | 528/39 |
| 2,486,162 | 10/1949 | Hyde | 528/39 |
| 2,857,356 | 10/1958 | Goodwin, Jr. | 528/39 |
| 2,873,265 | 2/1959 | Rust | 528/39 |
| 3,310,417 | 3/1967 | Lerner et al. | 528/39 |
| 3,403,050 | 9/1968 | Chadha | 528/39 |
| 3,489,782 | 1/1970 | Pruvost et al. | 528/10 |

FOREIGN PATENT DOCUMENTS

| | | |
|---|---|---|
| 2357184 | 5/1975 | Fed. Rep. of Germany . |
| 814740 | 6/1959 | United Kingdom . |
| 929374 | 6/1963 | United Kingdom . |
| 971599 | 9/1964 | United Kingdom . |
| 975302 | 11/1964 | United Kingdom . |
| 1271382 | 4/1972 | United Kingdom . |

OTHER PUBLICATIONS

Chemical Abstracts, 78, 1973, 30616h.

*Primary Examiner*—Melvyn I. Marquis
*Attorney, Agent, or Firm*—Oblon, Fisher, Spivak, McClelland & Maier

[57] ABSTRACT

A process for the production of silicic acid heteropolycondensates, wherein at least one hydrolysable silicic acid derivative; at least one substituted silane; optionally at least one functional silane and/or optionally at least one substantially involatile oxide soluble in the reaction medium or at least one compound forming a substantially involatile oxide are condensed in the presence of at least the quantity of water stoichiometrically required for hydrolysis and optionally in the presence of a condensation catalyst and/or a solvent. The polycondensates are useful in the production of membranes and adsorbents.

22 Claims, No Drawings

PROCESS FOR THE PRODUCTION OF SILICIC ACID HETEROPOLYCONDENSATES USEFUL AS MEMBRANES AND ADSORBENTS

BACKGROUND OF THE INVENTION

This invention relates to new silicic acid heteropolycondensates, to a process for their production and to their use as membranes and adsorbents.

Various membrane materials and adsorbents are known for the separation of mixtures of substances. These known membrane materials and adsorbents are being continuously developed with a view to improving their technical performance and economy. In the treatment of effluents, it has been possible for example by developing asymmetrical membranes to achieve the throughflow level required for commercial applications. On the other hand, there are still some unsolved problems in other fields of application. For example, known membrane materials, such as cellulose acetate membranes, are not particularly resistant to temperature and pressure and swell to a considerable extent in organic solvents. In consequence of the low resistance of these known membrane materials to temperature, pressure and solvents, their pore size is subject to continuous fluctuation in technical use and, as a result, can lead to non-reproducible results and to short service lives of the membranes.

Large numbers of adsorbents for purifying liquid or gaseous media are also known; for example active carbon and oxides having a high specific surface, such as aluminium oxide. With these known adsorbents, however, adsorption is generally non-specific and far from selective. In addition, the adsorption process is in many cases difficult to reverse at high adsorption levels, in other words desorption involves high energy consumption.

In addition, known adsorbents and membranes of which the surface has been chemically modified have the disadvantage that, in general, they only have a modifying monolayer at the surface with the result that they are extremely sensitive to mechanical and chemical influences, for example to hydrolysis.

It has now been found that certain silicic acid heteropolycondensates are particularly suitable for the production of temperature-, pressure- and solvent-resistant membranes for a variety of different separation problems. In granular or similar form, these silicic acid heteropolycondensates may be used as adsorbents even for highly specific separation which cannot be carried out satisfactorily, if at all, with known adsorbents. In addition, the silicic acid heteropolycondensates according to the invention are suitable for various other commercial applications.

SUMMARY OF THE INVENTION

The present invention relates to silicic acid heteropolycondensates which may be produced by condensing (a) at least one hydrolysable silicic acid derivative corresponding to the general formula $$SiR_4 \qquad \text{I}$$

in which R represents hydrogen, halogen, alkoxy or $-NR'_2$ ($R'$=hydrogen and/or lower alkyl), with the proviso that not all of the radicals R are hydrogen, and (b) at least one substituted silane corresponding to the general formula $$SiR_nR''_{(4-n)} \qquad \text{II}$$

in which R is as defined above, $R''$ represents alkyl, alkenyl, aryl or aralkyl and n is an integer of from 1 to 3, and (c) optionally at least one functional silane corresponding to the general formula $$SiR_n(R'''Y)_{(4-n)} \qquad \text{III}$$

in which R is as defined above, $R'''$ represents alkylene, phenylene, alkyl phenylene or alkylene phenylene, Y represents halogen or an optionally substituted amino, optionally substituted anilino, aldehyde, keto, carboxy, hydroxy, mercapto, cyano, hydroxyphenyl, diazo, carboxylic acid alkyl ester, sulphonic acid ($-SO_3H$) or phosphoric acid ($-PO_3H_2$) group and n is an integer of from 1 to 3, and/or (d) optionally at least one substantially involatile oxide soluble in the reaction medium or at least one compound of an element of Groups Ia to Va, IVb or Vb of the Periodic System which forms a substantially involatile oxide, in the presence of at least the quantity of water stoichiometrically required for hydrolysis and, optionally, in the presence of a condensation catalyst and/or a solvent, the quantities in which components (a) to (d) are used being selected in such a way that the silicic acid heteropolycondensate formed contains, based on oxides, from 35 to 90% by weight of component (a), from 10 to 50% by weight of component (b), from 0 to 15% by weight of component (c) and from 0 to 40% by weight of component (d).

Preferred silicic acid heteropolycondensates according to the invention contain, based on oxides, from 50 to 80% by weight and more particularly from 60 to 70% by weight of component (a), from 20 to 40% by weight and more particularly from 30 to 35% by weight of component (b).

from 0 to 10% by weight and more particularly from 0 to 8% by weight of component (c) and from 0 to 20% by weight and more particularly from 0 to 10% by weight of component (d).

If components (c) or (d) are used, the minimum quantity in which they are employed generally amounts to 1% by weight and preferably to 5% by weight.

The quantities indicated above relate to the composition of the silicic acid heteropolycondensates in terms of oxide units. In other words, components (a) to (d) are used in quantities such that the particular oxide unit formed by hydrolysis and condensation or the oxide equivalent formed by hydrolysis makes up to the specified proportion by weight (% by weight) in the final condensate. The quantity of hydrolysable silanes corresponding to the formula $R_nSi(OR)_{4-n}$ is calculated, for example, on the basis of oxide units corresponding to the formula $R_nSiO_{(4-n)/2}$, whereas the oxide equivalent $M_2O$ is the basis for example for metal alcoholates (d) corresponding to the formula MOR.

Apart from the conditions under which condensation is carried out, the quantitative ratio between the starting components (a) to (d) determines the properties of the silicic acid heteropolycondensates obtained and, in particular, the properties of the membranes and adsorbents produced from them. It has been found that the hydrolysable silicic acid derivatives corresponding to formula I are primarily responsible for the specific surface and porosity of the polycondensates, the substituted silanes corresponding to formula II for their mechanical strength (i.e. internal cohesion), the functional silanes corresponding to formula III for the number of reactive coupling sites and the oxide components (d) for the mechanical properties of the polycondensates or the membranes and adsorbents produced from them. In this connection, it is particularly important to use the hydrolysable silicic acid derivatives of formula 1 in a proportion of more than 30% by weight in order to ensure the necessary porosity of the silicic acid heteropolycondensates.

Components (a) and (b) are replaceable insofar as, instead of using a mixture of an orthosilicic acid ester (a) and a dialkyl silane (b), it is for example possible to use an equivalent quantity of a corresponding monoalkyl silane, for example $(CH_3)Si(OC_2H_5)_3$ or $(CH_3)SiCl_3$.

In the definition of the starting compounds of formulae I to III, several radicals R, R', R", R''' and Y may be the same or different in each case.

The alkyl radicals represent for example straight- or branched-chain radicals containing from 1 to 20 carbon atoms, preferably from 1 to 10 carbon atoms, in particular, lower alkyl radicals. Specific examples are methyl, ethyl, n-propyl, isopropyl, n-butyl, sec.-butyl, tert.-butyl, pentyl and n-hexyl.

The aryl radicals contain for example from 6 to 25, preferably from 6 to 14 and, more particularly, from 6 to 10 carbon atoms. Specific examples are phenyl and naphthyl, phenyl being preferred.

The alkenyl radicals are, for example, straight- or branched-chain radicals containing from 2 to 20 carbon atoms, preferably from 2 to 10 carbon atoms, and in particular are lower alkenyl radicals. Specific examples are vinyl and allyl.

The alkylene, alkoxy, alkylamino and aralkyl radicals are derived for example from the above-mentioned alkyl and aryl radicals. Specific examples are ethylene, trimethylene, methoxy, ethoxy, n- and i-propoxy, n-, sec.- and tert.-butoxy, monoethylamino, dimethylamino, diethylamino, benzyl and tolyl.

The expression "lower" applies to radicals containing from 1 to 6 carbon atoms, preferably from 1 to 4 carbon atoms and, more particularly, from 1 to 2 carbon atoms.

The above-mentioned radicals may optionally contain standard substituents, for example halogen atoms, lower alkyl, hydroxy, nitro or amino groups.

Of the halogens, fluorine, chlorine and bromine are preferred, chlorine being particularly preferred.

In component (c), n preferably has the value 2 or 3 more particularly the value 3.

Examples of suitable starting silanes corresponding to formula I are $(CH_3O)_4Si$, $(C_2H_5O)_4Si$, $SiCl_4$ and $HSiCl_3$.

Examples of suitable starting silanes corresponding to formula II are $(CH_3)_2SiCl_2$, $(CH_3)_2Si(OCH_3)_2$, $(CH_3)_2Si(OC_2H_5)_2$ and $(C_6H_5)_2SiCl_2$.

Examples of suitable starting silanes corresponding to formula III are $(C_2H_5O)_3Si(CH_2)_3NH_2$ and $(C_2H_5O)Si(CH_2)_3CN$.

These silanes may be produced by known methods: cf. W. Noll "Chemie und Technologie der Silicone", Verlag Chemie GmbH, Weinheim/Bergstrasse (1968).

Substantially involatile oxides soluble in the reaction medium are compounds of elements of Groups Ia to Va, IVb or Vb of the Periodic System which form substantially involatile oxides are used as starting components (d). These compounds react with the other components (a) to (c), and, in so doing, make it possible for the chemical and mechanical properties of the silicic acid heteropolycondensates obtained and of the membranes and adsorbents produced from them to be modified.

Component (d) is preferably derived from the following elements: Na, K, Mg, Ca, B, Al, Pb, P, As, Ti, Zr and/or V, the elements Na, Ca, Mg, B, Al and P being particularly preferred.

Of the substantially involatile oxides, $Na_2O$, $K_2O$, $CaO$, $B_2O_3$, $As_2O_3$ and $P_2O_5$ are preferred.

Compounds which form substantially involatile oxides soluble in the reaction medium are, for example, inorganic acids such as phosphoric acid and boric acid, their esters, halides and salts. It is also possible to use hydroxides, such as $NaOH$, $KOH$ or $Ca(OH)_2$, and alkoxides such as $NaOR$, $KOR$, $Ca(OR)_2$, $Al(OR)_3$ or $Ti(OR)_4$, R being derived from lower alcohols, such as methanol, ethanol, propanol, or butanol. Other suitable starting compounds are corresponding salts with volatile acids, for example acetates, basic acetates, formates, nitrates and halides, such as basic lead acetate.

To produce the silicic acid heteropolycondensates, the starting components are mixed in the required quantitative ratio in the absence of moisture, optionally in the presence of an organic solvent. Examples of suitable solvents are alcohols, preferably lower alcohols, such as methanol and ethanol, ketones, preferably lower dialkyl ketones, such as acetone and methylsiobutyl ketone, ethers, preferably lower dialkyl ethers, such as diethyl ether, amides, such as dimethyl formamide, and mixtures thereof.

Water is added at the same time or afterwards in at least the quantity stoichimetrically required for hydrolysing the hydrolysable groups present. In the context of the invention, hydrolysable groups are understood to be groups which are hydrolysable under the reaction conditions applied, i.e. Si—O-alkyl, Si—H, Si-halogen, metal-O-alkyl and similar groups. Based on alkoxy substituents, the stoichiometric quantity of water amounts for example to two thirds of the quantity of water required for hydrolysing all the alkoxy radicals according to formula because 1 molecule of water is split off for every 2 alkoxy radicals.

The polycondensation reaction may be carried out in the presence of a catalyst, for example a compound which releases protons or hydroxyl ions or an amine. Examples of suitable catalysts are water, acids, preferably volatile acids, such as hydrochloric acid or acetic acid, inorganic bases, such as sodium hydroxide, potassium hydroxide or calcium hydroxide, or lower alkylamines, such as triethylamine, water and acids being preferred. The catalyst is preferably used in a quantity of up to 3% by weight, based on the reaction mixture.

The polycondensation reaction is normally carried out at temperatures in the range from −20° to +130° C., preferably at temperatures in the range from 0° to 65° C. and, more particularly, at room temperature. The condensation time is determined by the particular starting components used and the quantities in which they are used, the catalyst used, the reaction temperature, etc. Where acid catalysts are used, shorter condensation times are applied.

The process according to the invention is generally carried out in a single stage until condensation is complete. In another embodiment, the starting components are precondensed for 1 minute to 24 hours under the temperature conditions mentioned above, optionally in the presence of a catalyst and/or a solvent, and are then condensed to completion in the presence of at least the quantity of water stoichiometrically required for hydrolysis.

Precondensation is accompanied on the one hand by transalkoxylation of the silanes and, on the other hand, by oligomerisation controllable through the reaction conditions selected, with simultaneous elimination of ether. In this connection, the occurrence of a cyclisation reaction can reduce the number of crosslinkable terminal groups, which inevitably results in a relatively low degree of polymerisation.

In general, the precondensation step is continued to such an extent that the precondensate formed is still thinly liquid in consistency, i.e. up to a degree of polymerisation corresponding to about 10 monomer units.

The polycondensation reaction may be carried out under normal pressure, elevated pressure or reduced pressure. The precondensation step may optionally be carried out at reflux temperature in the absence of air.

On completion of condensation, the gel formed may be carefully dehydrated and the solvent evaporated off. Drying is preferably carried out in a stream of air at room temperature. Drying may optionally be followed by a heat treatment carried out over a period of from several minutes to several hours, preferably over a period of from 15 minutes to 1 hour, at a temperature in the range from 100° to 160° C. and preferably at a temperature in the range from 110° to 130° C. Both the drying operation and the subsequent heat treatment may optionally be carried out under reduced pressure, for example in a high vacuum.

The silicic acid heteropolycondensates obtained or the membranes and adsorbents produced from them may also be subjected to an after treatment with water or steam. For example, they may be treated with water or steam at 4° to 150° C., for example for between 2 and 30 minutes. A 10- to 20-minute after treatment with boiling water has proved to be particularly advantageous. Thereafter the heat treatment described above is preferably applied or repeated.

For producing membranes, it is readily possible for example to cut the silicic acid heteropolycondensates obtained in the form of compact blocks into thin discs which may then be used as membranes either as such or after grinding. In another process, a solution of the silicic acid heteropolycondensate is cast onto a flat plate, for example of polyethylene, or onto a mercury surface and the solvent is evaporated off, a thin membrane film being left behind on the surface. Where precondensates are used, spread-coating and spray-coating methods for example may also be used in addition to casting.

Asymmetrical membranes may be produced for example by casting an incompletely cross linked precondensate, i.e. a precondensate produced with a less than stoichiometric quantity of water, onto a water surface. In this way, a relatively fine-pored condensate skin is formed on the water surface.

This condensate skin is responsible for the separating effect of the membrane, whilst the remaining silicic acid heteropolycondensate matrix represents a relatively coarse-pored supporting layer after condensation to completion.

The silicic acid heteropolycondensates or precondensates according to the invention may also be drawn into filaments, hollow fibres, tubes or hoses or otherwise processed and used in this form as membranes. Further processes for the production of membranes are described for example by S. Hwang and K. Kammermeyer in "Techniques of Chemistry", Volume VII, J. Wiley and Sons, New York (1975).

The membranes according to the invention have thicknesses of, for example, from 50 to 1000 $\mu$m. Accordingly, they are not self-supporting and have to be suitably protected, for example by porous or net-like supporting materials of glass, metals, plastics, ceramics or textiles. To this end, the membranes are stretched over the supporting material, for example by means of a frame, and are sealed off at the edges with silicone rubber or in some other way. Membranes of this type may also be used for ultrafiltration under pressure of from 1 to 50 bars.

Where the silicic acid heteropolycondensates accumulate in granular form during condensation, they are dried, optionally subjected to the above-described after treatment with water or steam and/or to a heat treatment and may then be directly used as adsorbents. Granular or other adsorbents may of course also be produced in the usual way from compact condensation products. In one special process for producing suitable particulate adsorbents, a viscous precondensate is poured into a suitable solvent to form beads. The adsorbents consisting of the silicic acid heteropolycondensates according to the invention may optionally be used in combination with standard support materials and/or known adsorbents.

The silicic acid heteropolycondensates according to the invention generally have a porosity of from 15 to 35%, an average pore diameter of from 0.5 to 2 nm (5 to 20 Å) and a BET surface of from 40 to 1200 $m^2/g$. These values are determined by the methods described by S. Brunauer in "The Adsorption of Gases and Vapours: Volume 1, Physical Adsorption", Princeton University Press, Princeton (1945).

Because of these properties, the silicic acid heteropolycondensates are particularly suitable for use as membranes and adsorbents for separating substances in liquid and gaseous media, preferably liquid media, and in particular, aqueous media. For example, the membranes according to the invention show a retention capacity for copper sulphate in aqueous solution of more than 99% for commercially useful throughflow rates. Equally good results are obtained with aqueous fluorescein solutions.

The membranes are generally suitable for the retention of ionic or molecular compounds, for example salts, acids bases or large organic molecules. The separation effect is determined on the one hand by the ratio of the effective pore diameter of the membrane to the diameter of the substance or compound to be retained and, on the other hand, by the functional groups of the membrane silicic acid heteropolycondensate. Silicic acid heteropolycondensates of starting silanes with hydrophilic or hydrophobic, acid or basic etc. substituents are used, depending on the nature of the substance to be retained. If a hydrophilic compound is to be retained, the starting silanes (b) and optionally (c) predominantly contain hydrophobic substituents, for example aryl and aralkyl radicals. If, on the other hand, a hydrophobic compound is to be retained, it is preferred to use starting silanes with hydrophilic substituents for example hydroxy, ester or acid radicals. In one particular embodiment, the membranes according to the invention may be used as ion-exchange membranes either by using suitably substituted starting silanes or by modifying the silicic acid heteropolycondensates or membranes with derivatising agents in the manner described hereinafter, so that they contain groups suitable for ion exchange, for example tertiary or quaternary amino groups, phenolic hydroxyl groups or aliphatic or aromatic —$SO_3^-$ or —$COO^-$-groups.

The adsorbents according to the invention are suitable for treating effluents and, in particular, for separating off pollutants, such as sulphuric acid, sulphonic acids, hydroxy carboxylic acids, chlorinated hydrocarbons, condensed aromatic compounds, alcohols and phenols, from dilute aqueous solutions. In addition, they may be used for example for isolating products of chemical or biochemical synthesis processes from the reaction mixture or for separating mixtures of products. In this connection, adsorption may be carried out continuously or in batches, for example in vessels or columns. One particular advantage of the adsorbents according to the invention lies in the fact that the adsorbed substances can be desorbed easily and inexpensively, for example with water, hot water, steam or dilute acids.

The membranes and adsorbents according to the invention are generally distinguished by a high temperature resistance. Depending on the particular functional groups of the starting component (c), the silicic acid heteropolycondensates are stable up to temperatures from 300° to 400° C. In addition, the membranes and adsorbents show excellent resistance to water and organic solvents so that, in contrast to known cellulose acetate membranes for example, they do not undergo any changes in pore size with time. In addition, the outstanding pressure resistance of the membranes and adsorbents according to the invention means that the pores do not close, even under high pressures, which makes it possible for relatively high pressures to be applied, particularly in ultrafiltration.

In contrast to known surface-modified silica gels and porous glasses, the membranes and adsorbents according to the invention are homogeneous products with statistically distributed functional units. Even in the event of mechanical wear of the surface during technical application, the characteristic physical and chemical properties of the condensate surface remain intact, so that the membranes and adsorbents remain serviceable for longer periods.

Because they are multicomponent systems, the silicic acid heteropolycondensates may be adapted as required to meet specific problems. By suitably selecting the starting components and their quantitative ratios, it is possible to obtain any combinations of properties, for example with regard to chemical and thermal resistance, mechanical properties and adsorption properties.

In this connection, it can be of advantage to modify the functional groups of the silicic acid heteropolycondensates or the membranes or adsorbents produced from them by standard methods of organic chemistry. Depending on the reactivity of the compounds or substances to be adsorbed or retained, it is possible to derivatise the silicic acid heteropolycondensate and/or to couple on another compound. Suitable derivatising agents are, for example, amines, carboxylic acids, acid chlorides, thiocarbamates, thiocarbamic acid chloride, diazo compounds, esters and sulphides. A polycondensate containing γ-aminopropyl groups may be modified for example by treating the polycondensate with an aqueous 2.5% glutaraldehyde solution for 30 to 60 minutes at room temperature. The diazo derivative may be obtained for example by reaction with p-nitrobenzoyl chloride, reduction of the nitro group to form the amine or diazotisation with nitrous acid. If the silicic acid heteropolycondensate already contains anilino groups through the use of suitable functional silanes, it may be directly diazotised with nitrous acid. Reaction of amino groups of the silicic acid heteropolycondensate with thiophosgene gives the isothiocyano derivative.

SPECIFIC EMBODIMENTS

The invention is illustrated by the following Examples.

Example 1

0.80 g of tetramethoxy silane and 0.60 g of diphenyl dichlorosilane were introduced into 25 ml of methanol, followed by the successive addition of 0.45 g of boric acid tributyl ester and 0.50 g of water. The mixture was condensed to completion in a closed polypropylene container. After 24 hours, a clear gel was obtained and was dried at room temperature in a stream of air. A flexible, clear, slightly opaque mass was formed after drying. Determination of the specific surface according to BET gave a value of approximately 300 $m^2/g$.

Example 2

1.85 g of tetramethoxy silane and 0.37 g of trimethyl chlorosilane were introduced into 10 ml of methanol, followed by the addition of 1.00 g of water. Condensation to completion was carried out in the same way as in Example 1. After drying in air, the mass was heat-treated (120° C.) for 1 hour in a high vacuum. Opaque granules having a specific surface of 490 $m^2/g$ were formed. Determination of the mean pore diameter on the basis of the water adsorption isotherms gave a value of approximately 0.7 nm.

Example 3

17.40 g of tetramethoxy silane and 2.95 g of trimethyl chlorosilane were introduced into 80 ml of methanol, followed by the successive addition of 1.31 g of diphenyl dichlorosilane and 5.00 g of water. Condensation of the mixture was carried out in a closed vessel. After 5 hours, a gel was obtained. After drying in an air stream, this gel gave a white, granular slightly opaque mass. The water adsorption isotherms indicated microporosity. The total porosity amounted to 20%. Measurement of the mean pore diameter gave a value of approximately 1 nm. Determination of the specific surface gave a value of 350 $m^2/g$.

Example 4

4.20 g of tetramethoxy silane and 0.70 g of dimethyl diethoxy silane were introduced into 20 ml of methanol, followed by the addition of 0.50 g of water. Condensation to completion was carried out in a polyethylene mould by introducing an approximately 0.5 to 1 mm thick liquid layer into the mould. Condensation gave a moderately elastic thin film having a specific surface of 830 m²/g, a total porosity of approximately 30% and a mean pore diameter of 0.5 nm.

Example 5

9.00 g of tetramethoxy silane and 0.46 g of dimethyl diethoxy silane were introduced into 50 ml of methanol, followed by the successive addition of 3.90 g of a 5% solution of sodium methylate in methanol and 2.00 g of water. The mixture was condensed to completion in a closed vessel. After drying in a stream of air, a glass-like hard product having a specific surface of 40 m²/g was obtained.

Example 6

4.67 g of tetraethoxy silane and 0.61 g of trimethyl chlorosilane were introduced into 20 ml of methanol, followed by the addition of 1.10 g of water. The mixture was condensed to completion at room temperature in a closed vessel. A glass-like elastic product having a specific surface of 570 m²/g was obtained.

EXAMPLE 7

4.67 g of tetraethoxy silane and 0.61 g of trimethyl chlorosilane were introduced into 20 ml of isobutanol, followed by the addition of 1.10 g of water. The product was condensed to completion in a closed vessel. A glass-like elastic product having a specific surface of 390 m²/g was obtained.

Example 8

2.06 g of tetramethoxy silane, 2.06 g of dimethyl dichlorosilane and 0.31 g of diphenyl dichlorosilane were introduced into 4 ml of methanol, followed by the addition of 1.10 g of water. The mixture was condensed to completion at room temperature in a closed vessel. An opaque elastic mass having a high specific surface was formed and could readily be cut into thin membranes.

Example 9

2.06 g of tetramethoxy silane, 0.52 g of dimethyl dichlorosilane and 0.43 g of trimethyl chlorosilane were introduced into a solvent mixture of 8.00 g of methanol and 10.00 g of acetone, followed by the addition of 1.10 g of water. The mixture was condensed to completion at room temperature in an open vessel. An opaque porous product was formed and may readily be cut into thin membranes.

Example 10

3.04 g of tetramethoxy silane and 1.50 g of dimethyl diethoxy silane were introduced into 40 ml of methanol and the resulting solution was poured in a thin layer (approximately 1 mm) into a polyethylene mould and condensed to completion in air at room temperature. Thin, porous, moderately elastic films having a specific surface of approximately 500 m²/g were formed.

Example 11

3.04 g of tetramethoxy silane, 1.50 g of dimethyl diethoxy silane and 0.20 g of γ-aminopropyl triethoxy silane were introduced into 40 ml of methanol and the resulting solution was poured as in Example 10 into an open polyethylene mould and condensed to completion in air. A thin, porous film having a porosity suitable for membranes was formed.

Example 12

3.04 g of tetramethoxy silane, 1.50 g of dimethyl diethoxy silane and 0.30 g of γ-cyanopropyl trimethoxy silane were introduced into 40 ml of methanol, followed by the addition of 1.10 g of water. Condensation to completion could be carried out either in a polyethylene mould, as in Example 10, to form thin membranes or in plastic containers to form granular products which could be used as absorbents.

Example 13

3.04 g of tetramethoxy silane, 1.50 g of dimethyl diethoxy silane and 0.10 g of γ-carbethoxypentyl trimethoxy silane were introduced into 40 ml of methanol, followed by the addition of 1.10 g of water. Further processing was carried out in the same way as in Example 12. Condensation to completion in a polyethylene mould gave thin films suitable for use as membranes, whereas condensation to completion in plastic containers gave granular products suitable for use as adsorbents.

Example 14

3.04 g of tetramethoxy silane, 1.50 g of dimethyl diethoxy silane and 0.15 g of γ-bromopropyl triethoxy silane were introduced into 40 ml of methanol, followed by the addition of 1.10 ml of water. Condensation to completion in a polyethylene mould gave thin films suitable for use as membranes, whereas condensation to completion in plastic containers gave granular products suitable for use as adsorbents.

Example 15

3.04 g of tetramethoxy silane, 1.50 g of dimethyl diethoxy silane and 0.10 g of carboxylpropyl triethoxy silane were introduced into 40 ml of methanol, followed by the addition of 1.10 g of water. Condensation to completion was carried out over a period of 24 hours in a closed plastic vessel. The gel formed was dried in a stream of air, granulated and heat-treated for 6 hours at 120° C. in a high vacuum. The condensate obtained was suitable for use as an adsorbent for adsorbing basic products from aqueous or alcoholic media.

Example 16

3.04 g of tetramethoxy silane, 1.50 g of dimethyl diethoxy silane and 20.00 g of a 1% solution of aluminium triisobutylate in isobutanol were introduced into 20.00 g of methanol, followed by the addition of 1.10 g of water. The mixture was condensed to completion in a closed plastic vessel. After 24 hours, a gel was obtained and, after drying in air, could be used for adsorption purposes.

Application Example 1

3.70 g of tetramethoxy silane and 0.74 g of trimethyl chlorosilane were dissolved in 20 ml of absolute methanol p.a., followed by the addition of 2.00 g of water. Condensation to completion was carried out over a period of 24 hours at room temperature in a closed vessel, giving a compact gel block. The gel was dried over a period of 2 weeks in a stream of air having a water content of 75% r.H. to form a compact block.

Wafers 2 cm in diameter and 0.5 mm thick were cut from this block using a diamond disc and installed in a membrane test apparatus. The test apparatus consisted of a liquid circuit in which a gear pump, a manometer, a throttle valve and the actual membrane tester were arranged. The liquid to be treated was delivered to the liquid circuit from a reservoir. The membrane tester consisted of a cylindrical vessel with an inlet and an outlet for the liquid to be treated. At the lower end of the vessel, near the inlet opening, a porous glass plate which acted as support for the membrane to be tested was arranged. The membrane was sealed off from the outside with silicone rubber on the porous glass plate. The separating properties of the membrane were tested under a pressure of 3 bars, the liquid to be treated being tangentially directed onto the membrane at a rate of flow of 200 ml/minute produced by the gear pump. The liquid passing through the membrane ran off at the lower end of the test apparatus and was collected in a suitable vessel.

Where a 2% aqueous copper sulphate solution was used as the test solution, a separation effect equivalent to more than 99% was obtained for a throughflow rate of 2 $l/m^2.h$, in other words the copper sulphate was almost completely separated off from the aqueous solution.

Application Example 2

2.10 g of tetramethoxy silane and 0.35 g of dimethyl diethoxy silane were dissolved in 10 ml of methanol, followed by the addition of 0.50 g of water. Condensation to completion was carried out in a closed polyethylene vessel at a temperature of 25° C. The thickness of the liquid layer was adjusted in such a way that the film formed had a thickness of approximately 0.1 mm. After gel formation, the layer was dried in air for 48 hours. A disc-like body approximately 2 cm in diameter was formed and was tested for its separating properties in the text apparatus described in Application Example 1.

Where a 1% solution of fluorescein in methanol was used, a separation effect equivalent to more than 99% was obtained for a throughflow rate of the permeate of 14 $l/m^2.h$.

Application Example 3

9.34 g of tetraethoxy silane and 1.22 g of trimethyl chlorosilane were dissolved in 40 ml of isobutanol, followed by the addition of 2.20 g of water. Condensation to completion was carried out over a period of 12 hours at 50° C. in a closed vessel. A particulate glass-like product was formed. It was boiled thoroughly in 1 liter of water for 1 hour and then dried for 6 hours at 120° C. in a high vacuum. The product had a specific surface of 390 $m^2/g$.

300 mg of the granular product were introduced into 7 ml of a 0.1% solution of methanol in water and left standing for 15 minutes.

Quantitative determination of the adsorbed methanol gave an extremely high adsorption rate of 20% of the quantity of alcohol used.

Application Example 4

6.00 g of tetramethoxy silane, 1.50 g of dimethyl diethoxy silane and 0.20 g of γ-aminopropyl triethoxy silane were introduced into 40 ml of methanol, followed by the addition of 4.40 g of water. Condensation to completion was carried out over a period of 24 hours in a closed mould. The gel obtained was dried for 6 hours at room temperature in a stream of air and then treated for another 6 hours at 150° C. in a high vacuum, followed by size-reduction to a grain size of from 0.2 to 0.5 mm.

300 ml of the product obtained were introduced into 7 ml of a 0.03% aqueous lactic acid solution and left standing for 15 minutes at room temperature. Quantitative determination of the lactic acid adsorbed gave an extremely high adsorption rate of 70% of the quantity of acid used.

Application Example 5

2.5 g of the mass produced in Application Example 4 were introduced into an adsorption column 10 cm long and 1 cm in diameter. A solution of 3.5 g of lactic acid in 35 ml of water was passed through the column. The concentration of lactic acid in the eluate was below the detection limit, in other words the adsorption rate amounted to more than 99.9%.

By treatment with boiling water for 15 minutes, 90% of the lactic acid adsorbed were desorbed again. The fact that the adsorbent could thus be regenerated without difficulty represents a major advantage over comparable adsorbents (active carbon) whose regeneration involves a considerably higher consumption of energy.

What is claimed is:

1. A process for the production of a silicic acid heteropolycondensate porous adsorbent, comprising: condensing (a) at least one hydrolysable silicic acid derivative corresponding to the general formula:

$$SiR_4 \qquad (1)$$

wherein R represents a group selected from the group consisting of hydrogen, halogen, alkoxy and —NR'$_2$, wherein R' is hydrogen lower alkyl and combinations thereof, with the proviso that not all the radicals R are hydrogen;

(b) at least one substituted silane corresponding to the general formula:

$$SiR_nR''_{(4-n)} \qquad (11)$$

wherein R is as defined above, R" represents a group selected from the group consisting of alkyl, alkenyl, aryl and aralkyl and n is an integer of from 1 to 3;

(c) optionally at least one functional silane corresponding to the general formula:

$$SiR_n(R'''Y)_{(4-n)} \qquad (111)$$

wherein R is as defined above, R''' represents a group selected from the group consisting of alkylene, phenylene, alkylphenylene and alkylenephenylene, Y represents a group selected from the group consisting of halogen, amino, anilino, aldehyde, keto, carboxy, hydroxy, mercapto, cyano, hydroxyphenyl, diazo, carboxylic acid alkyl ester, sulphonic acid (—SO$_3$H) and phosphoric acid (—PO$_3$H$_2$) groups and n is an integer of from 1 to 3; and/or (d) optionally at least one compound selected from the group consisting of substantially involatile oxides soluble in the reaction medium and compounds of elements of Groups Ia to Va, IVb and Vb of the Periodic System forming a substantially involatile oxide in the presence of at least the quantity of water stoichiometrically required for hydrolysis and in an organic solvent in the presence of a condensation catalyst in a single stage until condensation is complete, the quantities in which components (a) to (d) are used being selected in such a way that the silicic acid heteropolycondensate formed contains, based on oxides, from 50 to 90% by weight of component (a), from 10 to 50% by weight of component (b), from 0 to 15% by weight of component (c) and from 0 to 40% by weight of component; and thereafter removing said organic solvent and drying said polycondensate, thereby producing a porous adsorbent having a porosity of from 15 to 35% and a BET surface area of from 40 to 1200 m$^2$/g.

2. The process of claim 1, wherein said polycondensation reaction is carried out at temperatures of from −20° to +130° C.

3. The process of claim 2, wherein said polycondensation reaction is carried out at temperatures of from 0° to 65° C.

4. The process of claim 1, wherein said silicic acid heteropolycondensate formed contains, based on oxides, from 50 to 80% by weight of component (a), from 20 to 40% by weight of component (b), from 0 to 10% by weight and of component (c) and from 0 to 20% by weight of component (d).

5. The process of claim 4, wherein said silicic acid heteropolycondensate formed contains from 60 to 70% by weight of component (a).

6. The process of claim 4, wherein said silicic acid heteropolycondensate formed contains from 30 to 35% by weight of component (b).

7. The process of claim 4, wherein said silicic acid heteropolycondensate formed contains from 0 to 8% by weight of component (c).

8. The process of claim 4, wherein said silicic acid heteropolycondensate formed contains from 0 to 10% by weight of component (d).

9. The process of claim 1, wherein said organic solvent is selected from the group consisting of alcohols, ketones, ethers, amides and mixtures thereof.

10. The process of claim 1, wherein said condensation catalyst is selected from the group consisting of water, acids, inorganic bases and amines.

11. The process of claim 1, wherein said condensation catalyst is used in a quantity of up to 3% by weight, based on said reaction mixture.

12. The process of claim 1, wherein said component (d) is selected from the group consisting of substantially involatile oxides and compounds which form substantially involatile oxides of sodium, potassium, magnesium, calcium, boron, aluminium, lead, phosphorus, arsenic, titanium, zirconium and vanadium.

13. The process of claim 1, wherein said compound forming a substantially involatile oxide is selected from the group consisting of inorganic acids, their esters, halides or salts, metal hydroxides, metal alkoxides and metal salts of yolatile acids.

14. The process of claim 1, wherein said silicic acid heteropolycondensate obtained is after-treated with water or steam.

15. The process of claim 14, wherein said silicic acid heteropolycondensate is further heat treated at an elevated temperature.

16. Silicic acid heteropolycondensate porous absorbent prepared by the process claimed in claim 1.

17. Membranes produced from the silicic acid heteropolycondensated of claim 16.

18. The process of claim 1, wherein said starting components are precondensed in the presence of a condensation catalyst.

19. The process of claim 1, wherein said starting components are precondensed in the presence of a solvent.

20. The process of claim 1, wherein said starting components are precondensed in the presence of a condensation catalyst and a solvent.

21. The process of claim 1, wherein said polycondensation reaction is carried out at room temperature.

22. The process of claim 1, wherein said silicic acid heteropolycondensate is heat treated at an elevated temperature.

* * * * *